Patented Aug. 30, 1949

2,480,380

UNITED STATES PATENT OFFICE 2,480,380

RECOVERY OF CYANOACETIC ACID FROM AQUEOUS INORGANIC SALT SOLUTIONS

Leonard Nicholl, Nyack, and Herbert R. Elkinton, Blauvelt, N. Y., assignors to Kay-Fries Chemicals, Inc., West Haverstraw, N. Y., a corporation of New York No Drawing. Application June 18, 1947, Serial No. 755,486

4 Claims. (Cl. 260—465.4)

This invention relates to an improved method for recovering anhydrous cyanoacetic acid from aqueous inorganic salt solutions thereof. More particularly, the invention relates to a solvent extraction process wherein a salt-free extract layer is obtained which contains substantially all the cyanoacetic acid under treatment, in solution with some of the water and the extractant, and a second, water-rich layer containing traces of the acid and the solvent with substantially all of the separated salt values, which layer is discarded. The extract layer is then distilled, its water being removed as an azeotrope with the solvent, leaving a distilland comprising a solution of anhydrous cyanoacetic acid and solvent, the components of which can then be separated by distillation.

Cyanoacetic acid is usually produced by the following series of reactions, all being carried out in aqueous solution:

(1) $2ClCH_2COOH + Na_2CO_3 \rightarrow 2ClCH_2COONa + H_2O + CO_2$ (2) $2ClCH_2COONa + 2NaCN \rightarrow 2CNCH_2COONa + 2NaCl$ (3) $2CNCH_2COONa + H_2SO_4 \rightarrow 2CNCH_2COOH + Na_2SO_4$ The concentration of cyanoacetic acid in the final reaction bath will vary somewhat, depending on the concentrations of the reagents used. From a practical and commercial standpoint, it is desirable to have it as high as possible, without resorting to evaporation of water. Whatever the concentrations employed may be, the resulting solution will be saturated with regard to inorganic salts which are formed at the same time.

Because of these conditions, the recovery of cyanoacetic acid by methods hitherto proposed has been both difficult and unsatisfactory. The precipitation of the acid as the calcium salt and its recovery by treatment of the calcium salt with sulphuric acid is a procedure which is both tedious and difficult. When the acid is crystallized from aqueous inorganic salt solution, it is found that, due to the very high solubility of the acid in the solution, and also to the tendency of the acid to form a double compound with the inorganic salts present, it is practically impossible to obtain the acid in a state of reasonable purity. Additionally, there is a very controlling factor that the cost of evaporating large amounts of water, which is necessary if this procedure is to be followed, is practically prohibitive. Separation of the acid by distillation is very severely limited by the fact that the acid tends to decompose when the temperature reaches 100–105° C. As the acid boils around 108° C. at 15 mm. it is practically impossible to separate the acid by distillation from aqueous inorganic salt solutions, without excessive decomposition.

Different classes of organic compounds vary widely in their ability to serve as extractants for the recovery of cyanacetic acid from aqueous salt solutions. Non-polar compounds, such as the aliphatic and aromatic hydrocarbons are very poor extractants, as are the halogen derivatives of such hydrocarbons. Oxygenated compounds, such as alcohols, ethers, esters, ketones, exhibit varying abilities to act as extractants. Thus it is found that in general as an extractant becomes more polar in character, it tends to be a better extractant for cyanacetic acid.

It has also been noted that within any one homologous series, even if the lower member is a good extractant, this property falls rapidly as the series is ascended. Thus, in the case of the ethers, diethyl ether is a fairly good extractant for cyanacetic acid, whereas dipropyl, di-isopropyl and dibutyl ether are poor extractants, with the dibutyl ether much poorer than di-isopropyl and dipropyl ethers. The self-same phenomenon occurs with cyanacetic esters. Methyl cyanacetate is a good extractant for cyanacetic acid; ethyl cyanacetate is noticeably less so, and propyl and butyl cyanacetates are so much less satisfactory as to be impractical. It will be seen, therefore, that even in an homologous series of compounds, of which the first and second members are good extractants, the succeeding members of the series rapidly lose any ability to act as good extractants. It appears that the extracting power falls so rapidly with increase in molecular weight, that the members above about the third or fourth, possess such low extracting properties for cyanacetic acid as to be frequently impractical to use.

It has also been found that in most cases where the compound is a good extractant for cyanacetic acid, i. e., where there is a relatively high concentration of acid in the extract layer at equilibrium, there is also a relatively high concentration of water and inorganic salts. This results from the fact that with the high concentration of acid, the extract layer is now a good solvent for water, since the acid is very soluble in water and has a very high affinity for it, and the extract layer is also a good solvent for the salts as a result of the presence of a relatively high concentration of water.

While it is highly desirable to use as an extractant a chemical compound which will produce a relatively high concentration of acid in the extract layer, it is also important to note that certain limiting factors must be present in order to make the use of any extractant commercially feasible or practical. The azeotropic properties of the azeotrope of the extractant with water should be such that it possesses as high a concentration of water as is possible, with the result that the extract layer may be dehydrated as easily as is practicable. Additionally, at ordinary temperatures, the solubility of water in the extractant should be less than the concentration of water in its azeotrope with the extractant, in order that substantially all the water of the brine removed in the extract can be separated as an azeotrope with the solvent, thus simplifying the recovery of the extractant. The extractant should be susceptible of ready separation from its solution with the anhydrous cyanacetic acid, and, therefore, should not form a constant boiling mixture with the acid to be extracted, nor should it boil so close to the acid as to make separation by distillation difficult. Additionally, the extractants would have to be cheap in price in order to be usable practically on a large scale. Finally, the extractant must not react with the material being extracted.

It will now be seen that in order to choose a material which will serve as a satisfactory extractant, a practical compromise is necessary as regards its properties. For the purposes of the present invention, an extractant for cyanacetic acid would not be one to show the highest concentration of acid in the extract, but rather the one which will show as high a concentration of acid in the extract as possible without, and at the same time, taking so much water and inorganic salt in solution, that extra steps are necessary to separate either or both from the extract. By the improvements of the invention herein, such desirable results are obtained, and a water- and-salt-free extract is obtained which can be readily treated for direct recovery of the cyanacetic acid.

It has now been found that the desirable results postulated above, can be secured by using methyl isobutyl ketone and mesityl oxide as the best all-around solvents available for the purpose. The properties of these compounds are as follows:

1. *Methyl isobutyl ketone*

Boiling point N. P. _____degrees 116
Azeotrope with water
  composition (H₂O) _____per cent__ 24.3
  boiling point _____degrees__ 87.9
Solubility in water _____per cent__ 2.5
Water in methyl
  isobutyl ketone _____per cent__ 2.0

2. *Mesityl oxide*

Boiling point N. P. _____degrees__ 129
Azeotrope with water
  composition (H₂O) _____per cent__ 34.8
  Boiling point _____degrees__ 91.8
Solubility in water _____per cent__ 3.0
Water in mesityl oxide _____per cent__ 2.0

As noted above, it is desirable, in the conduct of the present process on a commercially practicable scale, to maintain the water content of the reaction mixture at as low a value or volume as possible. To this end, the process is exemplified by the following:

900 lbs. of chloroacetic acid are dissolved in 1300 lbs. of water in a glass lined vessel. This step is endothermic and heating may be required. Thereafter, 500 lbs. of soda ash are added gradually, care being taken to allow for evolution of carbon dioxide. When the soda ash is all reacted, the sodium cyanide (490 lbs.) is added in the dry state, gradually, at a temperature of 25 to 30° C. After the dry sodium cyanide has all been added, the temperature is raised to 50° C. for two hours. The equivalent weight of concentrated sulphuric acid is then added, gradually, and with cooling, so that the temperature is not permitted to rise above 50° C. An appreciable amount of salt is precipitated, and this precipitate is separated from the reaction solution by means of a centrifuge, leaving a reaction solution which is saturated with respect to the inorganic salt present. A 24% solution of cyanacetic acid containing approximately 730 lbs. of the acid is produced.

The high concentration of the acid in the solution makes for maximum efficiency in the extraction process which is now to be described:

The extraction process herein, as indicated above, can be carried out satisfactorily by the use of two exemplary extractants, methyl isobutyl ketone and mesityl oxide. The invention herein will be described with particular reference to the use of methyl isobutyl ketone as the extractant.

Using methyl isobutyl ketone as an extractant, aqueous solutions of cyanacetic acid are extracted to give an extract comprising an acid-rich extract layer, with some water, and an aqueous bottom layer containing minor amounts of ketone and substantially all of the salt. It has been found that the concentration of the acid in the extract layer is approximately 17.8% to 21.5% as the concentration of the acid in the aqueous layer varies from 17% to 25%.

The composition of the extract layers at ordinary temperatures has been found to be:

|  | Methl Isobutyl Ketone | Mesityl Oxide |
|---|---|---|
|  | Per cent | Per cent |
| Cyanacetic acid | 18.6 | 26.3 |
| Water | 5.2 | 8.4 |
| Ketone | 75.0 | 65.3 |
| Salt | None | None |

It is to be noted that the water is present in the extract layers in solution with the ketones.

With methyl isobutyl ketone as extractant the exhausted aqueous salt solution will contain approximately .4–.5% cyanacetic acid and .4% methyl isobutyl ketone.

The extract layer is treated to recover the acid by first distilling off the water content as an azeotrope with the ketone until all of the water is removed. The water-ketone azeotrope boils at 87.9° C. The ketone-rich layer can be reused in the process, and the water-rich, brine layer may be discarded. When the dissolved ketone is to be recovered, a suitable solvent is used to extract the same. The water is removed from the extract layer, as an azeotrope with the solvent, leaving a residue comprising anhydrous cyanoacetic acid dissolved in solvent. The remainder of the solvent is distilled off by maintaining the water-free liquid under vacuum, and at a liquid temperature below 90° C. The dehydrated extract is concentrated to approximately 70% cyanacetic acid, which has been found to require a final pressure of approximately 114 mm. At this stage, the solution is cooled to room temperature (25° C.), at which point the cyanacetic acid crystallizes out of the solution. This acid is separated by filtration from the mother liquor, the filtration being carried out of contact with air. Thereafter the filtrate is washed with benzene and vacuum dried. The yield of the crystallized acid is approximately 80%. The balance of the acid remaining in the mother liquor approximates 17% of the original amount and may be reused when the next batch is crystallized. The yields calculated for these operations are as follows:

(1) Yield of acid in extract after concentrating, calculated on the acid originally present in aqueous salt solution, 95%.

(2) Yield of acid in a single crystallization from the dehydrated concentrated extract 50 to 60%, depending on the concentration of the extract. The total recovery of the acid on crystallization is found to be approximately 95%. The properties of the acid recovered are as follows:

Acidity_____ 98–100%
Color_____ Light tan color
Melting point_____ 65–67°
Odor_____ Very slight ketone odor The acid is also recovered by concentrating the extract to approximately 95% cyanacetic acid content, which step will require a final vacuum of approximately 5 mm. with a liquid temperature if not over 95–100° C. The concentrated extract is then blown with air at 85–90° C. and under a vacuum of 20 mm. Proceeding under these conditions, a product exhibiting the following properties is obtained:

Acidity_____ 95–96%
Color_____ Dark brown
Melting point_____ 64–65°
Odor_____ Very slight ketone odor By way of resume, it is to be noted that the desirable results of the present invention follow as a result of the discovery of the special properties of methyl isobutyl ketone, and in particular the fact that the concentration of water in the solvent extract, at equilibrium, is less than the concentration of water-methyl isobutyl ketone azeotrope.

The unexpected efficiencies of the present process resulting from the use of methyl isobutyl ketone and mesityl oxide can best be appreciated by a comparison with another compound, methyl ethyl ketone, which has been prominently mentioned as a suitable extractant for recovery of cyanoacetic acid from aqueous inorganic salt solutions. These compounds are compared by means of the composition of the extract at equilibrium when extracting solutions of cyanacetic acid in aqueous inorganic salt solution containing 17% and 24% of acid respectively, is as follows:

|  | Methyl Ethyl Ketone, per cent | | Methyl Isobutyl Ketone, per cent | | Mesityl Oxide, per cent | |
|---|---|---|---|---|---|---|
| Acid in salt solution | 17.0 | 24.0 | 17.0 | 24.0 | 17.0 | 24.0 |
| Cyanacetic Acid | | 38.0 | | 18.6 | 26.3 | 30.7 |
| Water | | 20.0 | | 5.2 | 8.4 | 8.9 |
| Ketone | | 35.6 | | 75.0 | 65.3 | 60.1 |
| Inorganic Salts | | 6.4 | | None | 0.0 | .3 |

RATIO OF KETONE TO ACID NECESSARY TO EXTRACT AND DEHYDRATE

| Water-ketone | 4.26 | 4.03 | 2.48 | 1.96 |
|---|---|---|---|---|
|  | 1.00 | 1.00 | 1.00 | 1.00 |
| Azeotrope composition: | | | | |
| Water | 11.0 | 24.3 |  | 34.8 |
| Ketone | 88.0 | 75.7 |  | 65.2 |

Considering the methyl ethyl ketone as the prior art standard, it will be noted that the water amounts to approximately 35.6% of the ketone and water in the extract. Since the ketone-water azeotrope contains only 11% water, additional ketone would have to be added in order to completely dehydrate the extract. This results in the fact that the total minimum ratio of methyl-ethyl ketone to acid, necessary to insure the complete dehydration of the acid, is 4.26 to 1.00. With mesityl oxide the ratio of ketone to acid is 1.96 to 1.00. When the acid is to be crystallized, even more ketone will be required. Additionally, an appreciable proportion of this extractant is tied up as a constant boiling mixture with water. While this constant boiling mixture may be used as an extractant, there will always be an excess over that required for the extraction, which excess will have to be recovered, and the constant boiling mixture will not separate into two layers at ordinary temperature due to the fact that the solubility of water in methyl ethyl ketone is 13.5%, which is greater than the concentration of water in the azeotrope, which is only 11%. Therefore, a special added step will be required to recover the methyl ethyl ketone from its constant boiling mixture. Because of the fact that there is such a high concentration of water present at equilibrium in the extract, when using methyl ethyl ketone, there is also an appreciable amount of inorganic salts contained in the solution (6.5% in the case of the 24.6% cyanacetic acid solution). These inorganic salts precipitate out on dehydration. On a large commercial scale this means another operation.

Contrasting the disabilities of the prior art methyl ethyl ketone extractant with the presently proposed, and highly efficient methyl isobutyl ketone, it will be noted that the situation is appreciably different. The water in the extract, when methyl isobutyl ketone is used, amounts to 6.5% of the ketone and water alone. The ketone-water azeotrope contains 24.3% water. It is obvious from this that the extract can be dehydrated easily, without the necessity of adding more extractant, as has been found necessary in the case of the methyl ethyl ketone. The ratio of methyl isobutyl ketone to acid will be seen to be 4.03 to 1. Thus, in spite of the fact that more methyl isobutyl ketone is required per unit weight of acid than of methyl ethyl ketone, in the extraction, the large amount of methyl ethyl ketone required to dehydrate the extract actually means that somewhat more methyl ethyl ketone (4.26 lbs.) than methyl isobutyl ketone (4.03) per pound of acid extracted is required for the complete operation of extraction and dehydration of the extract. Where methyl isobutyl ketone is used, there is much less water present, under equilibrium conditions, in the extract, and little if any inorganic salt in the solution. Hence no salt precipitates on dehydration of the extract, thereby eliminating another process step or operation.

It will now be appreciated that there has been provided a novel method for the direct recovery of cyanacetic acid from aqueous inorganic salt solutions containing the same, which process involves the use of special extractants of the type of 6 carbon alkyl chains such as methyl isobutyl ketone and its corresponding unsaturated compound mesityl oxide.

What is claimed is:

1. A process for recovering anhydrous cyanoacetic acid from an aqueous inorganic salt solution thereof, which comprises extracting the acid from said solution with a solvent comprising an aliphatic ketone of the group consisting of methyl isobutyl ketone and mesityl oxide to form an acid-rich, aqueous ketone layer, and a substantially acid and ketone-free, salt-rich, briny layer, separating the layers, distilling the acid-ketone layer to remove the water as an azeotrope with the ketone and leave an anhydrous acid-ketone solution, and recovering the acid from said solution.

2. In a continuous process for the recovery of anhydrous cyanoacetic acid from an aqueous inorganic salt solution thereof, the steps which consist in passing such solution countercurrent to a stream of an extractant comprising methyl isobutyl ketone to form a salt-free extract layer comprising a solution of cyanoacetic acid, water, and methyl isobutyl ketone, and a water-rich layer containing substantially all the salt with traces of cyanoacetic acid and methyl isobutyl ketone, concentrating the salt-free extract layer by distilling off the water as an azeotrope with the methyl isobutyl ketone to completely remove all of the water present in the extract and thereafter crystallizing the cyanoacetic acid from the residual water-free solvent solution.

3. In a continuous process for the recovery of anhydrous cyanoacetic acid from an aqueous inorganic salt solution containing 17–25 percent acid, the steps which consist in passing such solution countercurrent to a stream of an extractant comprising methyl isobutyl ketone to form a substantially salt-free extract layer comprising a solution of cyanoacetic acid, water, and methyl isobutyl ketone, and a water-rich layer containing substantially all the salt with traces of cyanoacetic acid and methyl isobutyl ketone, discarding the said water-rich salt layer, and concentrating the salt-free extract layer by distilling off the water as an azeotrope with methyl isobutyl ketone to completely remove all of the water present in the extract and thereafter crystallizing substantially anhydrous cyanoacetic acid from the water-free solvent solution.

4. In a continuous process for the recovery of anhydrous cyanoacetic acid from an aqueous inorganic salt solution thereof containing 17–25% of the acid, the steps which consist in passing such solution countercurrent to a stream of an extractant comprising mesityl oxide to form a substantially salt-free extract layer comprising a solution of cyanoacetic acid, water, and mesityl oxide, and a water-rich layer containing substantially all the salt with traces of cyanoacetic acid and mesityl oxide, concentrating the salt-free acid extract layer by distilling off the water as an azeotrope with mesityl oxide to completely remove all of the water present in the extract and thereafter crystallizing substantially anhydrous cyanoacetic acid from the water-free solvent solution.

LEONARD NICHOLL.
HERBERT R. ELKINTON.

REFERENCES CITED

The following references are of record in the file of this patent:

UNITED STATES PATENTS

| Number | Name | Date |
| --- | --- | --- |
| 2,150,154 | Cope | Mar. 14, 1939 |
| 2,338,834 | Britton et al. | Jan. 11, 1944 |